(12) United States Patent
Stoiber et al.

(10) Patent No.: US 8,602,770 B2
(45) Date of Patent: Dec. 10, 2013

(54) APPARATUS AND PROCESS FOR TEMPERING PLASTICS-MATERIAL PREFORMS

(75) Inventors: Christian Stoiber, Michelsneukirchen (DE); Heinrich Deyerl, Teunz (DE); Jochen Hirdina, Regensburg (DE); Gerald Huettner, Vilseck (DE)

(73) Assignee: Krones AG (DE)

( * ) Notice: Subject to any disclaimer, the term of this patent is extended or adjusted under 35 U.S.C. 154(b) by 191 days.

(21) Appl. No.: 12/781,652

(22) Filed: May 17, 2010

(65) Prior Publication Data

US 2010/0289178 A1    Nov. 18, 2010

(30) Foreign Application Priority Data

May 18, 2009 (DE) .......................... 10 2009 021 792

(51) Int. Cl.
*B29C 49/42* (2006.01)
*B29C 49/68* (2006.01)

(52) U.S. Cl.
USPC .......................................... 425/526; 425/534

(58) Field of Classification Search
USPC .............................. 425/526, 534; 264/520, 521
See application file for complete search history.

(56) References Cited

U.S. PATENT DOCUMENTS

| | | | |
|---|---|---|---|
| 3,632,713 A | 1/1972 | Seefluth | 264/99 |
| 3,892,830 A | 7/1975 | Hudson et al. | 264/94 |
| 4,151,249 A | 4/1979 | Lee | 264/520 |
| 4,310,282 A * | 1/1982 | Spurr et al. | 425/533 |
| 5,101,990 A | 4/1992 | Krishnakumar et al. | 215/1 |
| 5,229,142 A * | 7/1993 | Yokobayashi | 425/522 |
| 5,853,775 A | 12/1998 | Oas et al. | 425/145 |
| 5,869,110 A | 2/1999 | Ogihara | 425/526 |
| 6,019,591 A * | 2/2000 | Valyi | 425/534 |
| 6,769,895 B2 | 8/2004 | Derouault et al. | 425/145 |
| 2003/0020193 A1 | 1/2003 | Hamamoto et al. | 264/40.1 |

FOREIGN PATENT DOCUMENTS

| | | | | |
|---|---|---|---|---|
| DE | 600 04 894 | | 7/2004 | B29C 49/42 |
| DE | 695 18 223 | | 5/2007 | B29C 45/00 |
| EP | 0 920 974 | | 6/1999 | B29C 49/42 |
| EP | 1 279 477 | | 1/2003 | B29C 49/42 |
| JP | 4-065217 | | 3/1992 | B29C 49/06 |
| JP | 06064027 | A * | 3/1994 | |
| JP | 09076338 | A * | 3/1997 | |
| JP | 2000-127230 | | 5/2000 | B29C 49/06 |
| JP | 2005212403 | A * | 8/2005 | |

OTHER PUBLICATIONS

Partial mechanical translation of Japanese reference JP 2005-212403 A (Kobayashi et al) dated Aug. 2005.*

* cited by examiner

*Primary Examiner* — Robert B Davis
(74) *Attorney, Agent, or Firm* — Hayes Soloway P.C.

(57) ABSTRACT

An apparatus for heating plastics-material performs includes a conveying device which conveys the plastics-material performs along a pre-determined conveying path. A heating device is arranged along this conveying path and which heats the plastics-material performs. The apparatus has at least one first contacting element arranged downstream with respect to the heating device for acting upon a wall of the plastic-material perform with a temperature profile varying in a peripheral direction and/or longitudinal direction of the plastics-material perform. The contacting element touches with a contact face a pre-determined region— bounded in the peripheral direction and/or longitudinal direction of the plastics-material performs— of a wall of the plastics-material perform in order to act upon this region with a temperature profile different from regions not touched by the contacting element. In addition, the apparatus has an advancing device which advances the contacting element to the plastics-material perform in a pre-determined direction.

16 Claims, 7 Drawing Sheets

APPARATUS AND PROCESS FOR TEMPERING PLASTICS-MATERIAL PREFORMS

BACKGROUND OF THE INVENTION

The present invention relates to an apparatus for the treatment and, in particular, the tempering and heating of plastics-material preforms. It is known from the prior art to produce plastics-material containers from so-called preforms in two-stage stretch blow-moulding processes. During this processing these preforms are heated to a defined process temperature in order to permit the shaping procedure during the stretch blow-moulding. In this case the heating is usually carried out by means of infrared radiation. These preforms have an orifice already formed to the final size and a body area still to be deformed.

The material to be processed (PET) is wherein strain hardening results during the stretching. The shaping temperature is very important during this. Use is made of this effect in the production of PET containers in order to optimise the distribution of the wall thickness of the container. In this case, in accordance with the prior art a temperature profile is applied to the preform in particular by way of infrared radiation (or even other radiation sources). The hotter region of the preform is deformed first, until the stretching resistance resulting from the strain hardening is greater than the resistance of the adjacent colder region. The temperature profile described is usually uniform around the periphery and varies in the longitudinal direction of the preform in a manner dependent upon the process. During the production of oval containers, however, not only is use made of this effect with a temperature layering in the longitudinal direction, but it is also adapted to the design of the container by differing temperature layering around the periphery. This process is also known as preferential heating. In this case the sides to be stretched to a greater degree should be heated by a special heating technique to a greater degree than the sides to be stretched to a lesser degree. These heating techniques mentioned are described in numerous documents and in part are also protected.

A process for the precise temperature adjustment of re-heated preforms is known from U.S. Pat. No. 3,892,830. Here those sides of the preform which are to be expanded along a main axis are touched with textured fingers in order to lower the temperature. U.S. Pat. No. 632,713 describes a process for blow-moulding whilst using an elongate oval plug. An apparatus for blow-moulding containers is known from U.S. Pat. No. 5,869,110. This apparatus has a heating device for heating a preform as well as a shaping unit in order to shape the preform. In addition, an intermediate region is provided which has a temperature-adjusting device in order to adapt the temperature of at least part of a surface of the perform.

DE 695 18 223 T3 likewise describes an apparatus for heating preforms. Here a temperature-setting member is mentioned which has cool members which are arranged along the axial direction of the preform and which are brought into contact with the container whilst using cylinders or the like. Only light contact is achieved here which does not, however, deform the container. EP 0 920 974 A2 describes an apparatus for blow-moulding non-round containers starting from a rotationally symmetrical preform. This apparatus has a rotation device in order to turn the preforms about their own axis, and a sensor which determines an angular position of each preform in a heating station.

A blow-moulding machine for containers, which contains an apparatus for orientating the preforms in a tool, is known from DE 600 04 894 T2. EP 1 279 477 A1 describes an apparatus and a process for blow-moulding a bottle. In this case, too, the preforms are positioned inside a blow mould between a heating step and a blowing step, wherein a sensor detects profiled positions of each preform, so that these regions are arranged in a pre-set orientation relative to the blow mould.

U.S. Pat. No. 5,101,990 describes a process for blow-moulding containers with oval cross-sections for example. Here ribs directed radially inwards are formed in the containers. In a process known from U.S. Pat. No. 4,151,249 for producing plastics-material containers, inwardly curved ribs are formed. These ribs are produced by contact-free cooling by air in individual regions of the preforms.

The object of the present invention is therefore to make available a new concept for providing the performs with a temperature profile varying in the peripheral direction.

SUMMARY OF THE INVENTION

An apparatus according to the invention for heating plastics-material preforms has a conveying device according which conveys the plastics-material preforms along a pre-determined conveying path, and a heating device which is preferably arranged along this conveying path of the plastics-material preforms and which heats the plastics-material preforms.

According to the invention the apparatus has a first contacting element for acting upon a wall of the plastics-material preform with a temperature profile varying in a peripheral direction of the plastics-material preform, this contacting element touching with a contact face a pre-determined region—bounded in the peripheral direction and/or longitudinal direction of the plastics-material preform—of the wall of the plastics-material preform in order to act upon this region with a temperature profile different from regions not touched by the contacting element, and the apparatus having an advancing device which advances the contacting element to the plastics-material preform in a pre-determined direction.

A conveying device is to be understood as being any device which conveys the plastics-material preforms, in this case for example gripping clamps which are arranged on a support or a conveying chain and which grip the plastics-material preforms on a support ring or on mandrels which engage in the plastics-material preforms or the orifices thereof.

In addition, an actual contact of the plastics-material preform takes place by way of the contacting element, this differing from the apparatus known from the prior art. Contact with the plastics-material preform is usually avoided in the prior art so as not to deform it before the actual blowing procedure. The contacting element preferably cools the pre-determined region of the plastics-material preform.

The contacting element is preferably advanced at least in a radial direction with respect to the plastics-material preform. In this case it would be possible for two contacting elements of this type to be advanced to the plastics-material preform in a precisely radial direction but it would also be possible to provide a clamp-like mechanism which moves the contacting element about a pre-determined pivot point, but thereby also moves it in a radial direction to the plastics-material preform.

A novel concept is thus proposed in order to apply the temperature layering to the plastics-material preform. This concept differs in a number of respects from previous processes, since this temperature layering in the longitudinal direction is carried out not by different heating but by way of a directed cooling (in the axial and/or horizontal direction). In this case the desired regions of the plastics-material preform are cooled in a targeted manner by way of contact with the contacting element which can be designed for example in the form of a tempered mould plate.

A cooling path, for example in the form of a cooling channel, can advantageously be built up by cooling segments in a transfer star. The plastics-material preform is cooled (preferably on an outer side) by the radiated cold and a preferential cooling is thus produced In this case the cooling effect can also be influenced by the residence time in the cooling channel, the machine performance and the quantity and the length of the active cooling segments or the cooling performance. It would also be possible, diverging from the present invention, for this cooling to be carried out by way of an external cooling without contact. The cooling performance or cooling time can also be influenced by the size of the transfer star mentioned.

In a preferred embodiment the size of the region along which the contact face touches the plastics-material preform is selected in a manner dependent upon the geometrical shape of the container to be produced. More specifically, it has been found in extensive studies that it is particularly preferable for the size of this region to be selected in a manner dependent upon a ratio between the long and short sides of the bottle to be produced. In this case said contact face increases in a particularly preferred manner, i.e. the size of the region with an increasing ratio between the side lengths of the container to be produced. In this way it has been found, for example, that with a side ratio of the finished bottle which is between 1.2:1 and 1.5:1 a percentage of the contact face should be between 10% and 70%, preferably between 20% and 60%. With a side ratio between 1.5:1 and 1.7:1 the contact face is advantageously between 40% and 80% and in a particularly preferred manner between 50% and 70%.

With a side ratio which is between 1.7:1 and 2:1 said contact face is between 50% and 90%, preferably between 60% and 85%. This means that in all events, as the side ratios increase, the percentage of the contact face also increases.

In a further advantageous embodiment the temperature of the contact face is variable. In this way it is possible for example, for liquid channels, through which a cooling liquid can be fed, to be arranged inside the contacting element. Other approaches would also be possible, such as for example Peltier elements, in order to cool the contact means or the contact face respectively. The cooling effect described can thus be regulated by way of the contact faces induced mechanically and by way of an adjustable plate temperature or temperature of the contact faces. It would also be possible for the contacting elements additionally to heat specified regions of the plastics-material preform so that they can be stretched in an improved manner.

In a further advantageous embodiment the contacting element contacts an outer wall of the plastics-material preforms. It would also be possible, however, for the contacting element to abut against an inner wall of the plastics-material preforms, in particular in the case of containers of relatively large cross-section. Contacting the outer walls of the plastics-material preforms, however, is preferred.

In a further advantageous embodiment the contacting element causes a deformation of the plastics-material container at least temporarily. In the case of this embodiment an at least slight squeezing of the plastics-material preform is deliberately desired. In this way, it is possible to ensure a surface contact between the plastics-material preform and the contacting element. It is thus possible, for example, for two contacting elements to be provided and for a minimum distance between these two contacting elements to be smaller than an external radius of the plastics-material container. It is advantageous for a contact pressure of the contacting element to be variable with respect to the plastics-material preform. This variability or adjustability of the contact pressure leads to the possibility of also working with a defined squeezing of the plastics-material preform.

The apparatus preferably has a second contacting element which contacts a second region—bounded in the peripheral direction of the plastics-material preform—of the wall of the plastics-material preform. In this case it is possible for these two contacting elements to be opposite to each other, respective to the plastic perform the plastics-material preform and to clamp the latter in a closed state between themselves.

In a particularly preferred embodiment the apparatus has a clamping device which contains the contacting elements and advances the contact faces to the plastics-material preform. This clamping device, which can be actuated for example by way of guide cams, represents a particularly advantageous embodiment for cooling the plastics-material preform at pre-determined positions. In this case a plurality of clamping devices of this type can be arranged on a support wheel and the plastics-material preforms are transferred to these clamping devices. It is possible for the support wheel to have provided thereon a holding device which for example grips the plastics-material preforms on the orifices thereof and, in addition, offset with respect to the plastics-material preforms in the longitudinal direction thereof the individual clamping devices which effect a cooling of the wall of the plastics-material preforms and, in particular the outer walls.

It is preferable for at least one contacting element to be pivotable about a pre-determined pivot axis. It is particularly preferred for the two contacting elements to be pivotable in each case about pre-determined pivot axes, in which case these pivot axes do not coincide and, in a particularly advantageous manner, are parallel beside each other. It is also possible, however for the pivot axes to coincide. It is advantageous for a plurality of clamping devices of this type to be arranged on a rotatable support.

In a further advantageous embodiment the apparatus has a contacting element in the form of a base element which contacts the base of the plastics-material preform in order to temper it and, in particular, it likewise cools it. In this way, a purposeful shaping of a base portion of the finished container can be achieved. This base element is preferably also suitable for blow-moulding so-called petaloid bases. In this case the movement of the base element can be linked to a movement of the contacting elements mentioned above. In addition, it would be possible for a base element of this type to be advanced to the plastics-material preform by a separate actuating means for example from below by means of a cam or an electric motor and/or a pneumatic or hydraulic drive. It is also pointed out that this base element can also be used independently of the contacting elements mentioned above, i.e. in particular only a tempering or cooling of the base region of the plastics-material preform is carried out. In this case it is also possible for this contacting element to be made circular, so that the contact region is limited only in the longitudinal direction.

In addition, it would also be possible on the one hand for a clamping device to have the contacting elements, but on the other hand for these contacting elements also to have arranged thereon base portions which contact a base of the plastics-material preforms. In this way for example, a ring could be arranged in the bases of all the clamping devices. This ring could be used subsequently to stabilise the base and could also be present in the finished container as a so-called assembly ring which defines a region of greater wall thickness.

In addition, a clamping device could be made in a plurality of parts, i.e. a plurality of contacting elements could be arranged one above the other in the longitudinal direction of the plastics-material preform.

In a further advantageous embodiment the contact face of the contacting elements is curved. More specifically, it is possible for this contact face to be shaped individually. In one embodiment it has the same radius as the plastics-material preform on the outer surface thereof. It would also be possible, however, for the radius of curvature of the contact face to be slightly larger than the radius of curvature of the plastics-material preform, so that in the event of a specific squeezing the wall of the plastics-material preform can abut more easily against the now increased radius of curvature of the contact face.

In a further advantageous embodiment the apparatus has a cooling module arranged downstream of the heating device on the conveying path of the containers, and the contacting elements are component parts of this cooling module. This means that in this case the containers are first heated and are then cooled at pre-determined positions. The contacting elements are preferably component parts of this cooling module. In this way it would be possible for the containers first to be heated and then for example to be conveyed in a plurality of conveying devices arranged on a support wheel and to be cooled at pre-determined positions during this conveying. The contacting elements can also be designed in such a way that they form additional webs in the containers which are not included in the (following) blow mould.

In a further advantageous embodiment an orientation device is also provided which orientates a rotational position of the plastics-material preforms to a pre-determined position with respect to the longitudinal direction. This is particularly important in those containers which not only have an oval shape but also in which a screw closure is present at a precisely defined rotational position. In this case the plastics-material preforms have to be orientated in a specified rotational position in a longitudinal direction before the actual cooling. An orientation device of this type can have a sensor element which detects specified positions of the orifice or a thread respectively and orientates the plastics-material preform to these positions.

The present invention further relates to a plant for producing plastics-material containers, which has an apparatus of the type described above, as well as a shaping device arranged downstream of this apparatus in a conveying direction of the plastics-material preforms for shaping plastics-material preforms into plastics-material containers. This means that the heated and locally cooled plastics-material preforms are then expanded in a shaping unit, such as for example a blow-moulding machine, to form plastics-material containers.

The present invention further relates to a process for heating or tempering plastics-material preforms, in which these plastics-material preforms are conveyed along a pre-determined conveying path and are heated by means of a heating device. According to the invention a non-uniform temperature profile is applied in a peripheral direction and/or longitudinal direction of the plastics-material preforms, as at least one first contacting element is advanced to the plastics-material preform, and it contacts with a contact face a pre-determined region—bounded in the peripheral direction and/or longitudinal direction of the plastics-material preform—of a wall of the plastics-material preform in order to act upon this region with a temperature profile different from regions not touched by the contacting element and, in particular, to cool it.

In this case too it is thus proposed with respect to the process that the plastics-material preforms should be contacted on a wall and, in particular, on an outer wall and at these corresponding positions should not be heated, as customary in part in the prior art but be cooled. It is advantageous for the plastics-material preforms first to be heated in their entirety and preferably uniformly and then to be cooled in part. The contact face preferably cools the limited region of the plastics-material preform.

BRIEF DESCRIPTION OF THE DRAWINGS

Further advantageous embodiments may be seen in the accompanying drawings, in which.

DETAILED DESCRIPTION OF THE INVENTION

Figure 1:
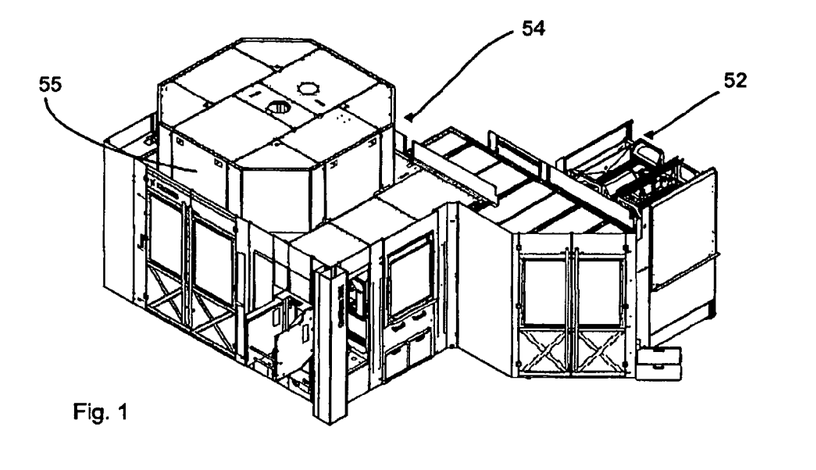
FIG. 1 is an overall view of an apparatus for shaping plastics-material preforms.

FIG. 1 is a diagrammatic illustration of an apparatus for shaping plastics-material preforms. In this case this reference numeral 54 relates to the actual blow-mould unit, such as for example a blow-mould machine, and the reference numeral 55 to a housing. The reference numeral 52 designates in its entirety a heating device which heats the plastics-material preforms.

Figure 2:
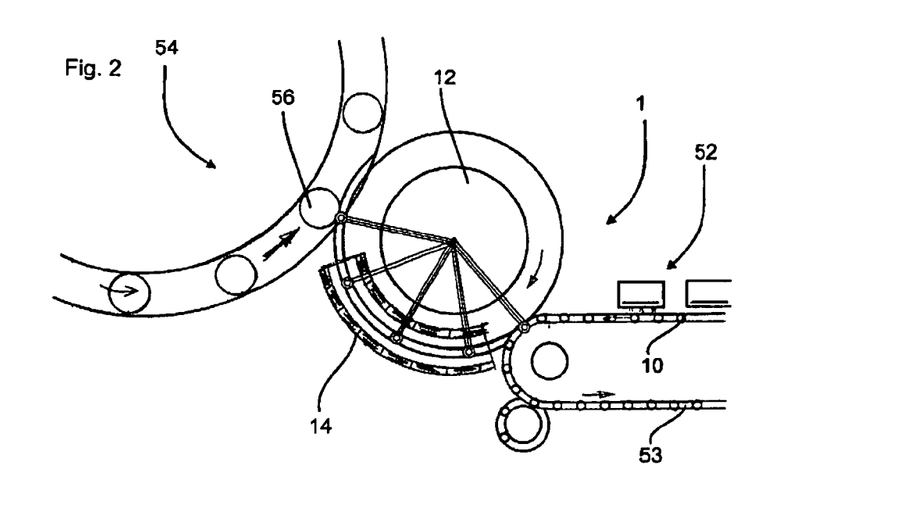
FIG. 2 is a diagrammatic illustration of an apparatus according to the invention.

FIG. 2 is a diagrammatic illustration of an apparatus according to the invention. In this case too the heating device 52 is provided, through which the plastics-material preforms 10 are conveyed with the aid of a conveying means, in this case a conveying chain 53, and are uniformly heated (except for the threaded region). This heating device 52 is adjoined by a support wheel 12 which takes over the plastics-material preforms 10 and conveys them through a cooling path 14 (shown only schematically) along which the plastics-material preforms are cooled locally. This cooling path is adjoined by the blow-mould unit 54 which has a plurality of blow-moulding stations 56 in which the plastics-material preforms are expanded to form plastics-material containers. The heating device 52 and the cooling path 14 together form the apparatus 1 according to the invention.

Figure 3A:
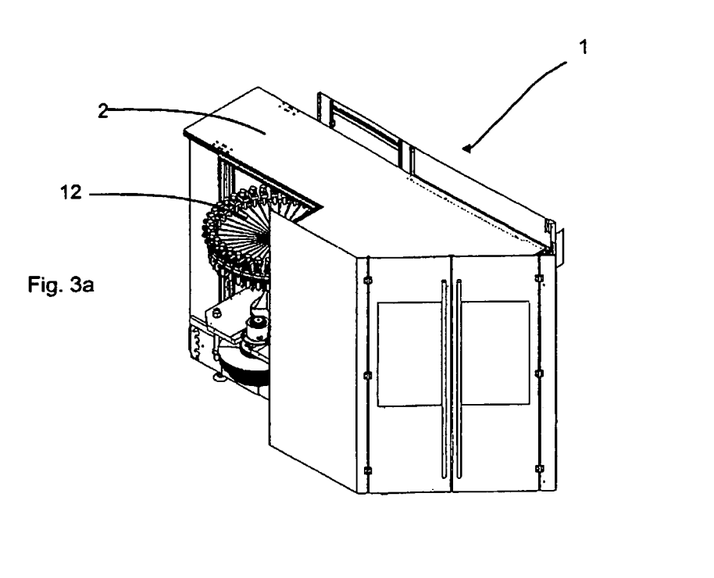
FIG. 3a shows a module for cooling the plastics-material preforms locally.
Figure 3B:
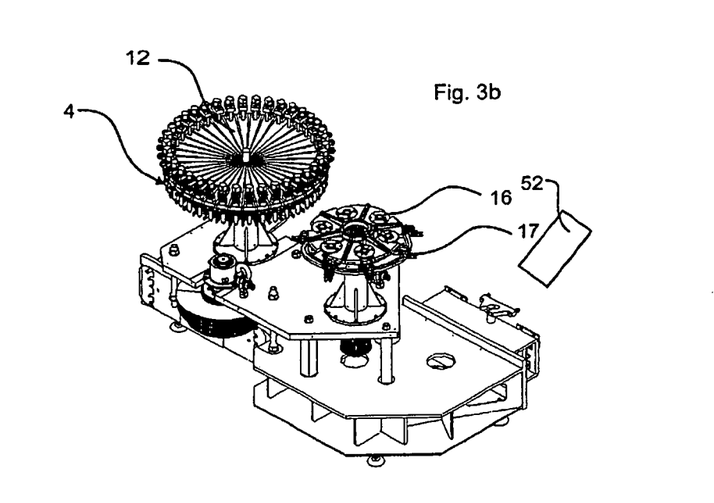
FIG. 3b shows a module of FIG. 3a with the housing removed.

FIGS. 3a and 3b show an apparatus 1 according to the invention. In this case a housing 2, which has been removed in the illustration in figure 3b for the sake of better visualization, is shown in the illustration of FIG. 2. This apparatus has a support wheel 12 on which a plurality of contacting elements 4 are provided which thus move along a circular line.

The reference numeral 16 designates an advancing star which advances the plastics-material preforms to the support wheel 12, i.e. the individual contacting elements 4. A plurality of gripping elements 17, such as gripping clamps, are likewise arranged on this advancing star 16. A heating device 52 (shown only diagrammatically), which is designed for example in the form of a continuous furnace through which the preforms are conveyed, can be provided upstream with respect to this advancing star 16. In this case the rotary movements of the advancing star 16 and of the support 12 can be synchronised with one another by means of gear mechanisms for example. It would also be possible, however, for drive motors regulated in each case to be provided for driving these two devices. The support wheel 12 is a component part of the conveying device for conveying the plastics-material preforms.

Figure 4A:
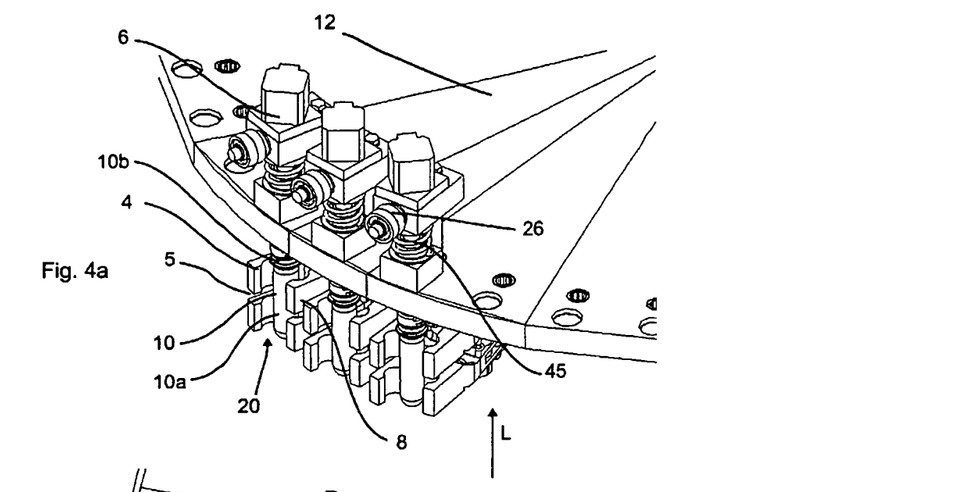
FIGS. 4a-4c are three illustrations of a contacting unit.

FIG. 4a is a detailed illustration of the support 12 on which a plurality of contacting devices 20 (only three shown here) are arranged. These contacting devices 20, or more precisely the contacting elements thereof, in each case contact the plastics-material preforms 10 in a body region 10a. A thread 10b of the plastics-material preforms is preferably not touched. The reference numeral 6 designates an orientation device optionally present, such as for example a rotary drive, which rotates the plastics-material preforms 10 about the longitudinal axis thereof. The plastics-material preform can be displaced along the longitudinal direction L thereof by means of a cam roller 26 and can be pre-stressed by means of a spring device 45.

The individual contacting devices 20 have in each case two contacting elements 4, 8 which touch the plastics-material preform from two sides in order to cool it. The contacting devices 20 thus also constitute the initial advancing devices which advance the contacting elements to the plastics-material preform. In the embodiment illustrated in the figures the contacting devices 20 are designed in each case in the form of clamping devices.

The contacting members 4 and 8 respectively are designed in two parts in this case, i.e. they have a gap 5 between them. The individual contacting members 4 are preferably capable of being tempered and, in FIG. 4a in particular the upper and lower contacting elements 4 and 8 respectively are also capable of being tempered in different ways. It would thus be possible for example for the lower contacting element to be kept cooler than the upper contacting element. Furthermore, specific regions of the contacting elements could also be tempered in different ways.

In addition, it would be possible for the inner faces of the contacting elements 4, 8 to be made interchangeable. Tempering bores or even heating elements can be arranged for example in a suitable holding means or an outer part of the contacting members. The heat of these heating elements can be transmitted by the contact between the outer part and the actual contacting element. The contacting member 4, 8 can also be arranged on the respective support thereof by means of the recess 5.

Figure 4B:
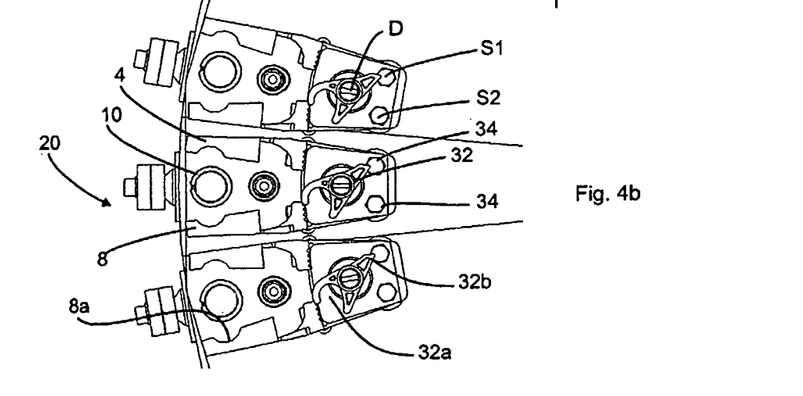

FIG. 4b is a plan view from below of the clamping device 20 also shown in FIG. 4a. In this case a switching lever or switching cam 32, which has a front recess 32a and a rear stop face 32b, may be seen. The switching cam 32 can be pivoted about the axis of rotation D thereof by means of these two rear stop faces, it being possible for suitable (fixed) guide cams for example to be used for this purpose. An opening or closing of the clamping device 20 or a reciprocating movement of the contacting elements 4, 8 to and from each other is achieved by pivoting this switching cam 32. The recess 32a of the switching cam 32, which in this case is designed in the shape of a half-moon, is provided for very large switching angles. In this way a fixed control pin (not shown), which engages in the cam, can turn this cam 32 much further. The pivot axes S1 and S2 of the two contacting elements 4, 8 are provided in the region of the hexagonal bolts 34.

Figure 4C:
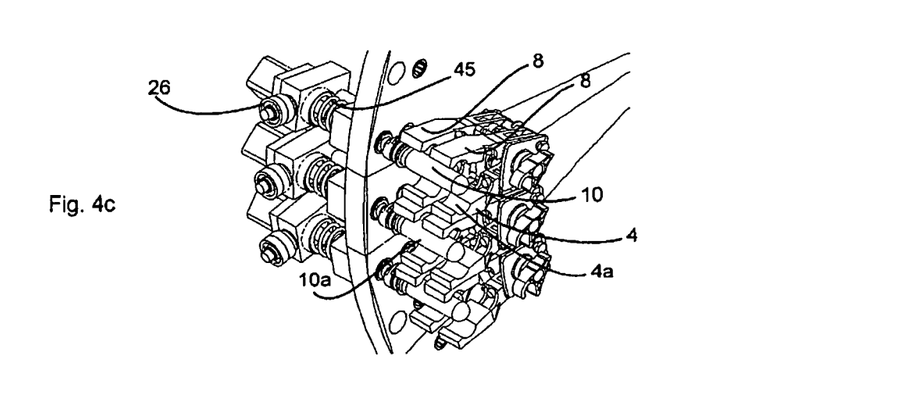

FIG. 4c is a side view of the arrangement shown in FIG. 4a. In this case too the contacting elements 8 and 4, which rest against the outer wall 10a of the preforms, may be seen. In the embodiment shown in FIGS. 4a to 4c the contacting elements 4, 8 rest with the contact faces 4a, 8a thereof planar against the preforms. Diverging therefrom or in addition thereto, the contacting elements can also, however, contact or squeeze the preform in such a way that additional webs which are not contained in the blow mould are formed in the preform. These webs may be for example webs extending in the longitudinal direction of the preform or on the other hand horizontal or obliquely extending or curved webs. In this way, it is possible to produce very light bottles, without a groove geometry for stabilisation being necessary for this purpose.

A reinforcement is made here by way of a different distribution of material and not by way of bottle-design elements. The application of groove geometries of this type is possible in the case of both round and non-round containers. In addition, it would also be possible for transverse ribs to be applied in the manner of a pinch (a continuous ring for example in the body of the container) or even for longitudinal ribs to be provided which increase the load capacity in the longitudinal direction of the container.

Figures 5A, 5B:
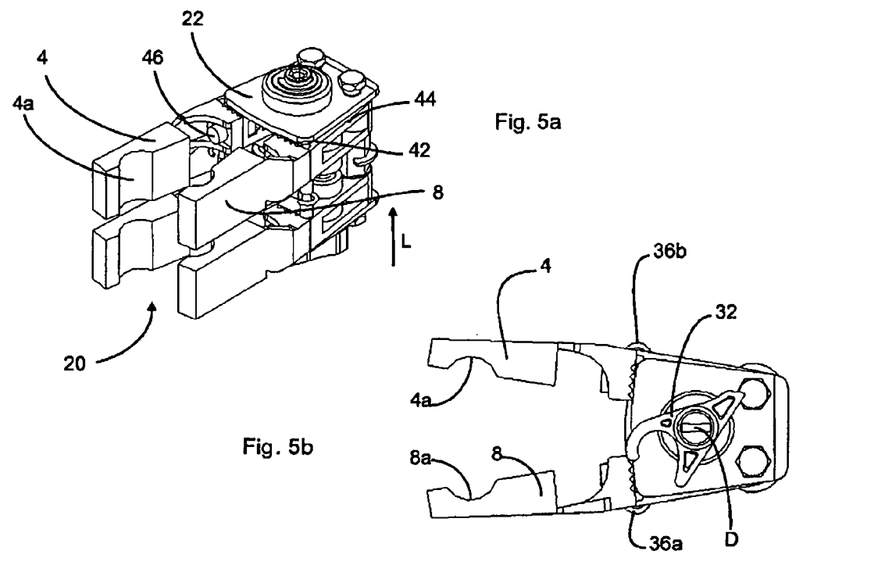
FIGS. 5a-5c are three illustrations of a contacting element.

FIG. 5a shows an individual clamping device 20. It may be seen that the two contacting elements 4 and 8 are arranged on respective supports 44 by way of a connecting point 42. More precisely, these contacting elements are capable of being extracted in the longitudinal direction L in each case and they can thus be replaced by other contacting elements. The reference numeral 46 designates a fastening device such as a bolt in order to screw the contacting elements to the respective pivotable supports 44.

FIG. 5b is a plan view from below of a clamping device 20. As already mentioned, in this case the switching cam 32 can be pivoted or rotated about the axis D thereof. A further switching cam (not shown) is provided in the interior of the clamping device and, in particular, between the two contacting elements 4 and 8. This part, which is arranged between the contacting elements, is shaped in an oval manner or like a feather key. When it is set transversely, the clamping device 20 remains open, i.e. the two contacting elements 4 and 8, and thus also the corresponding contact faces 4a and 8a are at the maximum distance from each other. When said cam is turned through a specified dead centre, the clamping device 20 remains open. In order to close the clamps again, the cam is turned back again through the dead centre and the two contacting elements automatically close. In order to close these contacting elements a spring device is provided, only two spring clips 36a and 36b of which are shown, which press the two contacting elements 4 and 8 together by way of a clamping force. A region on the ends of the clamps is preferably made resilient so that it is possible to pass through the dead centre.

Figure 5C:
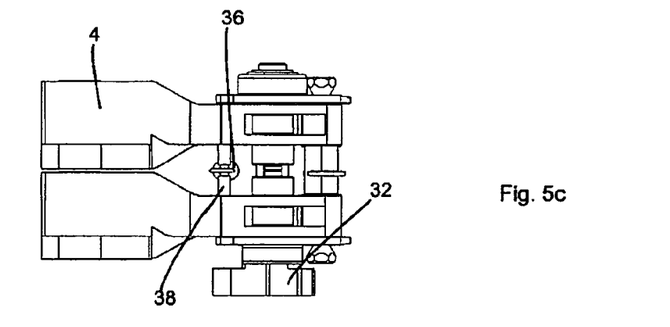

FIG. 5c is a side view of the clamping device 20. In this case too, the spring device 36, which draws the two contacting elements 4 and 8 together, may be clearly seen The two contacting elements 4 and 8 can be connected to each other by way of a transverse web 38, so that their movements are coupled to each other.

Figure 6A:
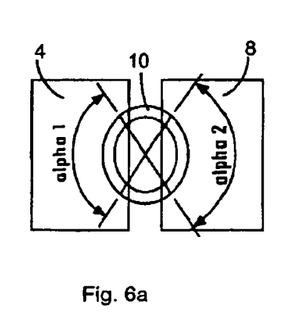
FIGS. 6a-6b are two illustrations to show the contacting.
Figure 6B:
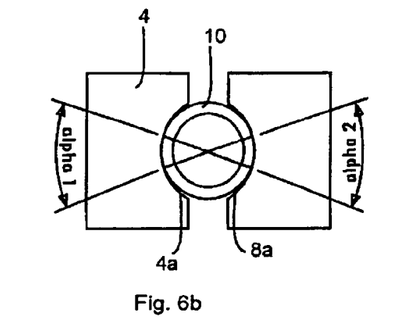

FIGS. 6a and 6b are two illustrations to show a contacting procedure of the preform. In the illustration of FIG. 4a a slightly greater squeezing of the preform occurs than in the case of the illustration of FIG. 6b. The contact face between the contacting elements and the plastics-material preform 10 can be influenced in different ways. It is thus possible, as shown in FIG. 6a, for the contact face 4a to be precisely adapted to the plastics-material preform 10 or, as shown in FIG. 6b, to be set by different manners of squeezing to the desired angle of embrace.

A combination of the two variants shown in FIGS. 6a and 6b is preferably selected, i.e. it is preferable for a rough setting to be pre-set by way of a shaping of the contact faces and a fine adjustment is carried out by way of a manner of squeezing. It is evident that an at least slight deformation of the preform also occurs in the case of the illustration of FIG. 6b. It is preferable to carry out a squeezing of the plastics-material preform which amounts to between 0.05 mm and 0.8 mm, preferably between 0.1 mm and 0.4 mm, in radius.

Those faces of the plastics-material preform 10a, which is touched by the contact faces 4a and 8a, are cooled at the same time. It is pointed out, however, that a heating of this region is also carried out by means of an inverse procedure.

Figures 7A, 7B:
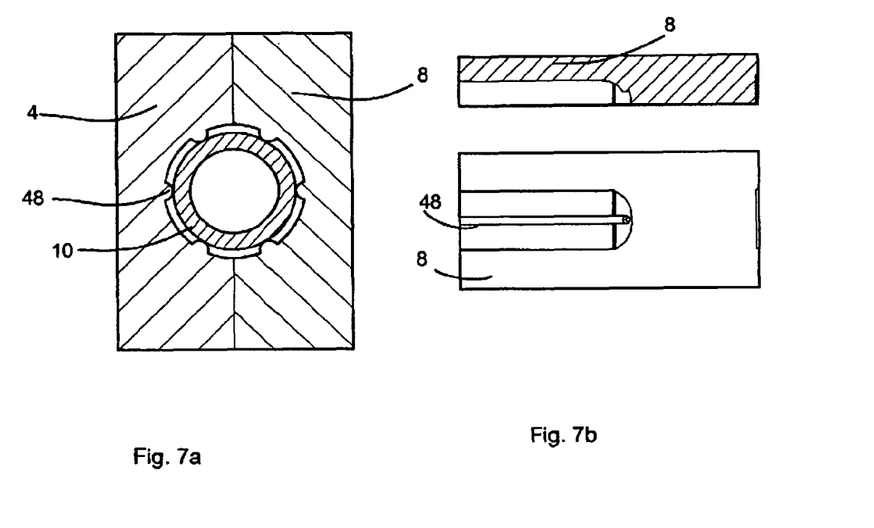
FIGS. 7a-7c are three further possible illustrations to show a contacting of the plastics-material preform.
Figure 7C:
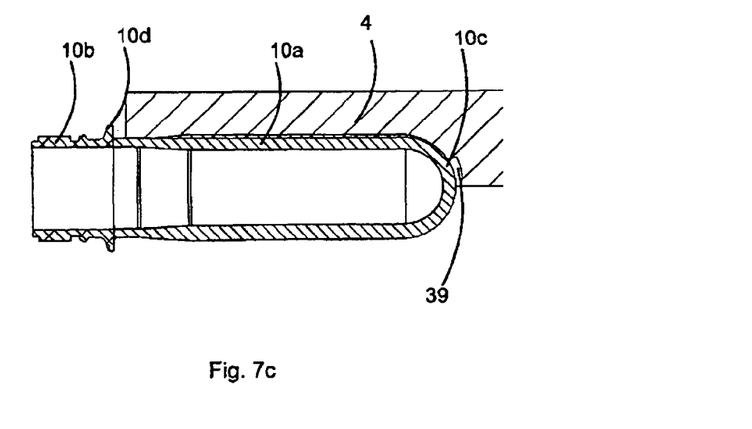

FIGS. 7a to 7c are three further illustrations for forming reinforced regions in the preform. In the illustration of FIG. 7a two contacting elements 4, 8 are shown which each have elongate projections 48 which project into the external periphery or the outer wall of the plastics-material preform 10 in a closed state. In this case too an at least local squeezing of the preform thus occurs.

In this way, longitudinal ribs (in particular in the form of accumulations of material) of the plastics-material preform can be produced. Two illustrations of a contacting element 8 (also shown in FIG. 7a) are given in FIG. 7b. Here the longitudinal rib 48, which ends just before the position of the injection point (not shown) of a plastics-material container, is also particularly shown.

This rib 48 projects in all events into the base of the plastics-material preform. In this case too it is evident that the contacting element also closes completely around the base of the preform, so that the latter can also optionally be cooled. The base part is thus contained in the contacting elements to be advanced laterally. In principle it is possible for the clamping device 20 to operate with any desired number of contacting elements to be advanced laterally and, in addition, for it to have a base part optionally in a plurality of parts (for example for blow-moulding petaloid bases). This plurality of contacting elements can also be capable of being advanced or moved independently of one another.

As mentioned, coolant channels, which permit a throughflow of coolant through the contacting elements 4, 8, can be arranged in the contacting element. FIG. 7c is a further illustration in which a plastics-material preform is also shown. In the illustration shown in FIGS. 7a to 7c the contacting element touches only the body region 10a of the plastics-material preform 10. In addition, it would also be possible, however, for a region of the contacting element—in particular if it is used for cooling purposes—also to rest against a thread region or neck region (support ring plus thread) of the container, so that the latter can be further cooled by the clamp. In this way it is possible to achieve a very great difference in temperature between the support ring 10d of the plastics-material preform 10 and the region directly below it shortly before the actual blow-moulding procedure, so that a large amount of material can also be removed from the region directly below the support ring 10d, but on account of its strength or low temperature the support ring 10d is not deformed. The reference numeral 39 designates a recess below an injection point of the plastics-material preform.

Figure 8A:
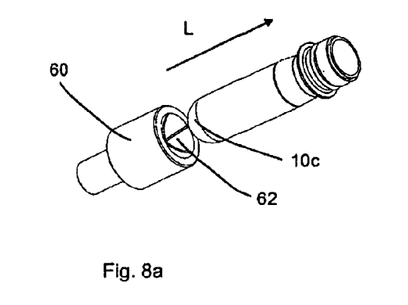
FIGS. 8a-8b are two illustrations of the contacting of a base region of a plastics-material preform.
Figure 8B:
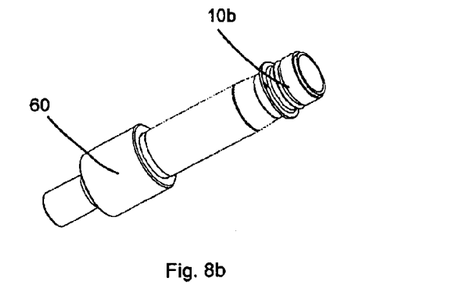

FIGS. 8a and 8b are a further illustration of the apparatus according to the invention. In this case a contacting element 60 is provided which is used specially for tempering the base area 10c of the container. This contacting element 60, which can be advanced in this case to the preform in the longitudinal direction L, can also have provided therein ribs 62 which are then present as an accumulation of material in the blow-moulded container without rib formations of this type having to be present in the corresponding blow mould for this purpose. FIG. 8b shows a state in which the contacting element 60 contacts the plastics-material preform 10. In this case this contacting element 60 can also be advanced by a separate actuating means such as a fixed guide cam or even a motor-driven, pneumatic or hydraulic drive.

Figure 9:
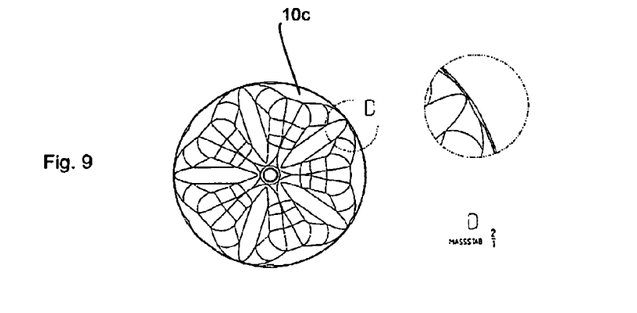
FIG. 9 is an illustration to show a base of a container.

FIG. 9 shows an example of a shaping of a base of a plastics-material preform or a plastics-material container.

Figure 10A:
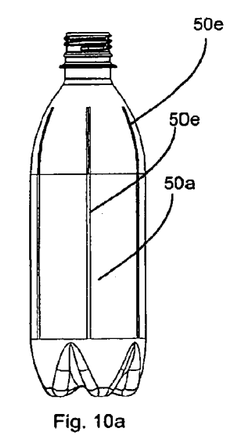
FIGS. 10a-10c are three illustrations of containers produced.
Figure 10B:
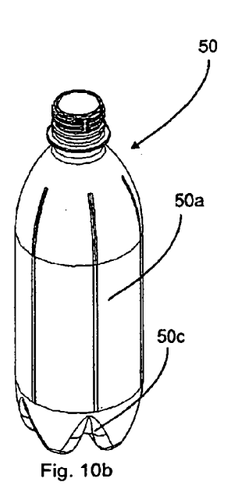
Figure 10C:
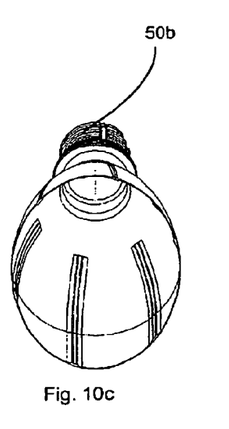
Figure 11A:
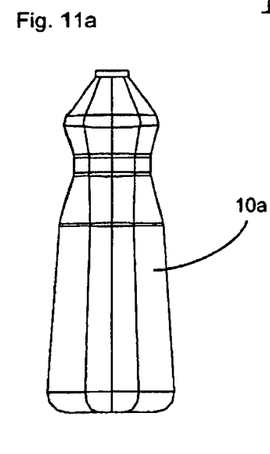
FIGS. 11a-11c are three further illustrations of a manufactured plastics-material container.
Figure 11B:
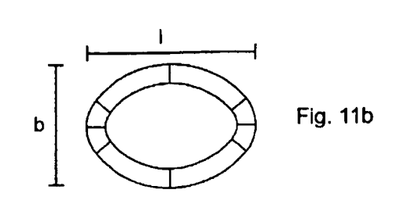
Figure 11C:
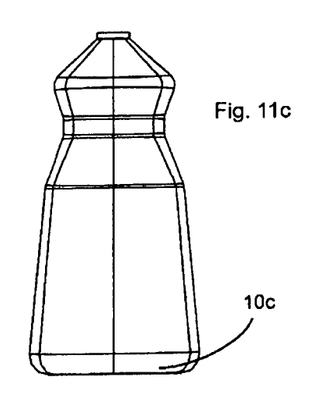
Figure 12A:
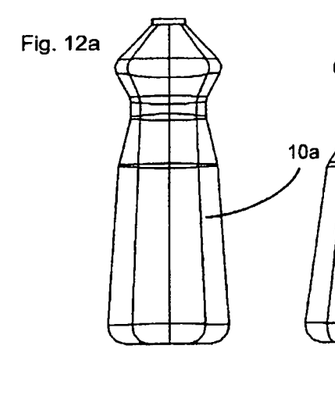
FIGS. 12a-12c are three further illustrations of a manufactured plastics-material container.
Figure 12B:
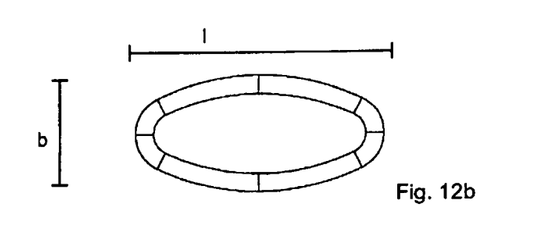
Figure 12C:
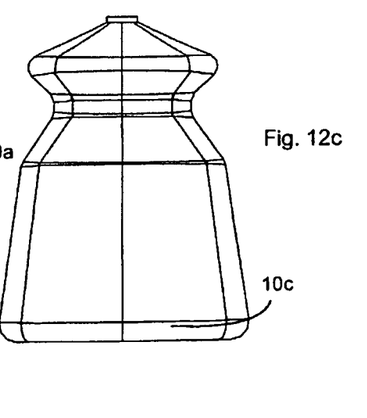

A finished container 50 is shown in FIGS. 10a to 10c. It is evident that this container 50 has on the body 50a thereof a plurality of longitudinal ribs 50e which thus extend in the longitudinal direction I of the container. In this case these longitudinal ribs can be formed by the preferred cooling of the container as described here in the scope of the present invention.

In addition, the shaping of the base 50c of the container 50 can be aided by the arrangement of the contacting element shown in FIGS. 8a and 8b. As mentioned above, the thread 50b remains unaffected by the actual shaping procedure.

FIGS. 11a to 11c and 12a to 12c respectively are illustrations of two different containers. The containers shown in FIGS. 11a to 11c and 12a to 12c differ in particular with respect to the ratio between their longitudinal extension I and width extension b. This ratio is approximately 1:1.5 in the case of the container shown in FIGS. 11a to 11c and approximately 1:2 in the case of the container shown in FIGS. 12a to 12c. In a corresponding manner, in order to form the container shown in FIGS. 11a to 11c, smaller contact faces of the contacting elements are used on the plastics-material preform than in the case of the plastics-material container shown in FIGS. 12a to 12c. In order to produce the container shown in FIGS. 11a to 11c, an overall area in a region of 80% of the plastics-material preform can be touched by the contacting elements for example, whereas the corresponding proportion of the contacting face in the case of the container shown in FIGS. 11a to 11c can be approximately 40%.

It is pointed out that the contacting element arranged downstream of the heating device can also be designed in the form of a module. In this way it would be possible for the contacting element and preferably also the advancing device also to be retrofitted in the case of already existing plants and to be arranged for example between the heating device and a blow-moulding machine. In this way the contacting element and the advancing device could be arranged in a common module such as a tempering module, this tempering module being used in particular to act upon the wall of the (already heated) preform with a temperature profile. In this way it is possible for machines of this type which heat the preforms uniformly also to be made usable by retrofitting with this module for the non-uniform heating of plastics-material preforms.

All the features disclosed in the application documents are claimed as being essential to the invention insofar as they are novel individually or in combination with the prior art.

LIST OF REFERENCES 1 apparatus
2 housing
4 contacting element 4a contact face
5 recess/gap
6 orientation device
8 contacting element
8a contact face
10 plastics-material preforms
10a body region/outer wall
10b thread
10c base region container
10d support ring
12 support/support wheel
14 cooling path
16 advancing star/transfer star
17 gripper element
20 contacting device/clamping device
26 cam roller
32 switching cam/switching lever
32a front recess switching cam
32b stop face
34 hexagonal bolts
36 spring device
36a spring clip
36b spring clip
38 transverse web
39 recess
42 connecting point
44 support
45 spring device
46 fastening device (e.g. bolt)
48 projections/longitudinal rib
50 finished container
50a body of the container 50
50b thread
50c base of the container
50e longitudinal ribs
52 heating device
53 conveying means
54 blow-moulding unit
55 housing
56 blowing station
60 contacting element
62 ribs
L longitudinal direction
D axis of rotation
l longitudinal extension
b width extension
S1, S2 pivot axes

The invention claimed is:

1. An apparatus for heating plastics-material performs for producing bottles having long sides and short sides, with a conveying device which conveys the plastics-material preforms along a pre-determined conveying path, and with a heating device which is arranged along the conveying path of the plastics-material preforms and which heats the plastics-material preforms, wherein the apparatus has at least one first contacting element arranged downstream with respect to the heating device for acting upon a wall of the plastics-material preform with a temperature profile varying in a peripheral direction and/or longitudinal direction of the plastics-material preform, which contacting element touches with a contact face a pre-determined region bounded in the peripheral direction and/or longitudinal direction of the plastics-material preforms of the wall of the plastics-material preform in order to act upon said region with a temperature profile different from regions not touched by the contacting element, and the apparatus has an advancing device which advances the contacting element to the plastics-material preform in a pre-determined direction, wherein the contacting element is arranged on a support wheel, wherein a size of the region of the wall touched is selected in a manner dependent upon a ratio between the long and short sides of the bottle to be produced, and an additional contacting element arranged on a support wheel, and wherein the additional contacting element is arranged on a support and capable of being extracted in a longitudinal direction.

2. The apparatus according to claim 1, wherein a temperature of the contact face is variable.

3. The apparatus according to claim 1, wherein the contacting element contacts an outer wall of the plastics-material preforms.

4. The apparatus according to claim 1, wherein a plurality of contacting elements is arranged on the support wheel.

5. The apparatus according to claim 1, wherein a contact pressure of the contacting element is variable with respect to the plastics-material preform.

6. The apparatus according to claim 1, wherein the apparatus has a second contacting element which contacts a second region— bounded in a peripheral direction of the plastics-material preforms— of the wall of the plastics-material preform.

7. The apparatus according to claim 1, wherein the apparatus has a clamping device which contains the contacting elements and advances the contact faces to the plastics-material preform.

8. The apparatus according to claim 1, wherein the apparatus has a further contacting element which contacts a base of the plastics-material preform.

9. The apparatus according to claim 1, wherein the contact face is curved.

10. The apparatus according to claim 1, wherein the apparatus has a cooling module arranged downstream of the heating device on the conveying path of the containers, and the contacting elements are component parts of the cooling module.

11. A plant for producing plastics-material containers with an apparatus according to claim 1, and a shaping device arranged downstream of said apparatus in a conveying direction of the plastics-material preforms for shaping plastics-material preforms into plastics-material containers.

12. The apparatus according to claim 1, wherein the contacting elements are designed in two parts.

13. The apparatus according to claim 1, wherein coolant channels are provided which permit a throughflow of coolant through the contacting element.

14. The apparatus according to claim 1, wherein a plurality of contacting elements is arranged on the support wheel.

15. An apparatus for heating plastics-material preforms, with a conveying device which conveys the plastics-material preforms along a pre-determined conveying path, and with a heating device which is arranged along the conveying path of the plastics-material preforms and which heats the plastics-material preforms,
wherein,
the apparatus has at least one contacting element arranged downstream with respect to the heating device for acting upon a wall of the plastics-material perform with a temperature profile varying in peripheral direction and/or longitudinal direction of the plastics-material perform, which contacting element touches with a contact face a pre-determined region bounded in the peripheral direction and/or longitudinal direction of the plastics-material preforms of the wall of the plastics-material perform in order to act upon the region with a temperature profile different from regions not touched by the contacting element, and the apparatus has an advancing device which advances the contacting elements to the plastics-material perform in a predetermined direction, wherein the contacting element is arranged on a support wheel, wherein an orientation device is provided, which orientates a rotational position of the plastics-material preforms to a predetermined position, and wherein the orientation device has a sensor element which detects specified positions of the orifice or a thread respectively.

16. An apparatus for heating plastics-material preforms with a conveying device which conveys the plastics-material preforms along a pre-determined conveying path, and with a heating device which is arranged along the conveying path of the
plastics-material preforms and which heats the plastics-material preforms, wherein, the apparatus has at least one first contacting element arranged downstream with respect to the heating device for acting upon a wall of the plastics-material perform with a temperature profile varying in a peripheral direction and/or longitudinal direction of the plastics-material perform, which contacting element touches with a contact face a pre-determined region bounded in the peripheral direction and/or longitudinal direction of the plastics-material preforms of the wall of the plastics-material perform in order to act upon the region with a temperature profile different from regions not touched by the contacting element, and the apparatus has an advancing device which advances the contacting element to the plastics-material perform in a pre-determined direction, wherein the contacting element is arranged on a support wheel, and wherein the contacting element is arranged on a support and capable of being extracted in a longitudinal direction.

* * * * *